US006622998B2

(12) United States Patent
Wong

(10) Patent No.: US 6,622,998 B2
(45) Date of Patent: Sep. 23, 2003

(54) CUTTING BLOCK

(76) Inventor: Yan Kwong Wong, Unit 1016-17, 10/F Metro Centre II 21 Lam Hing Street, Kowloon Bay, Kowloon (HK)

( * ) Notice: Subject to any disclaimer, the term of this patent is extended or adjusted under 35 U.S.C. 154(b) by 0 days.

(21) Appl. No.: 10/032,863

(22) Filed: Oct. 26, 2001

(65) Prior Publication Data

US 2002/0096814 A1 Jul. 25, 2002

(30) Foreign Application Priority Data

Oct. 26, 2000 (CN) .......................................... 262661 U

(51) Int. Cl.⁷ ................................................. A47J 43/00
(52) U.S. Cl. ................................................. 269/289 R
(58) Field of Search .......................... 269/289 R, 302.1, 269/13, 15, 16, 79

(56) References Cited

U.S. PATENT DOCUMENTS

| 4,065,115 A | * | 12/1977 | Popeil et al. ................. 269/16 |
| 4,924,843 A | * | 5/1990 | Waren ..................... 269/289 R |
| 4,977,644 A | * | 12/1990 | Evans et al. ................ 452/195 |
| 5,116,279 A | * | 5/1992 | Perry .......................... 452/195 |
| 5,203,548 A | * | 4/1993 | Sanders ................... 269/289 R |
| 5,546,852 A | * | 8/1996 | Bidwell ................... 269/289 R |
| 5,826,286 A | * | 10/1998 | Cranston ....................... 269/15 |

* cited by examiner

Primary Examiner—Robert C. Watson
(74) Attorney, Agent, or Firm—Kenyon & Kenyon

(57) ABSTRACT

A cutting block includes two block parts pivotably connected together for relative movement between the first position in which the block parts together provide a flat cutting surface, and a second position in which the block parts form, a V-shape facilitating the transfer of food after the cutting operation. The cutting block has a handle extending outward from one of the block parts and actuator being operable to cause the relative movement between the two block parts.

12 Claims, 2 Drawing Sheets

CUTTING BLOCK

FIELD OF THE INVENTION

This invention relates to cutting blocks for food.

BACKGROUND OF THE INVENTION

Known cutting blocks are comparatively simple in construction, usually being in the form of a single wooden or plastic board. The disadvantage of such a cutting block is that when chopped food is to be put into a bowl or pan, an instrument such as a spatula or knife is used and, as a result, splinters or chips from the cutting block can be scrapped into the bowl or pan together with the food. This represents a health risk.

A further disadvantage is that when the cutting block together with the chopped food is lined so that the chopped food may be directly transferred into the bowl or pan, it is difficult to grasp the block, due to its considerable weight and absence of any handle, and it is easy to spill the food.

STATEMENT OF INVENTION

According to the present invention there is provided a cutting block comprising a first block part providing a first cutting surface thereon, a second block part providing a second cutting surface thereon, said first and second block parts being pivotably connected together for relative movement between a first position in which said first and second cutting surfaces are contiguous and coplanar and a second position in which said fist and second cutting surfaces subtend between them an angle of less than 180°, a handle extending outwardly from said fist block part, and actuation means operable to cause said relative movements.

Preferably said handle comprises a first handle part connected to said first block part and a second handle part forming part of said actuation means, wherein said actuation means extend from the handle to said second block part Preferably said handle includes biasing means to resiliently bias said first ad second handle parts away from each other.

Preferably said actuation means comprise first and second levers, a part of said first lever forming said second handle part and being relatively moveable relative to said second handle part, and said second lever being connected to said first lever and extending laterally therefrom to translate the movements of said first lever from the handle to the second block part.

Preferably the second lever has extending there through a locating pin for limiting the movement of said second lever Preferably the handle is provided with grinding beans for sharpening a knife.

Preferably the handle is provided with means for holding grinding material.

Preferably the handle is detachably mounted on said first block part.

Preferably the block member is provided with a drain hole and more preferably with a liquid draining groove which extends into the drain hole.

Preferably the cutting block is shaped to provide a recess within which is located a cutting knife.

According to the present invention there may also be provided a cutting block comprising a first block part providing a fist cutting surface thereon, a second block part providing second cutting surface thereon, said first and second block parts being pivotally connected together for relative movement between a first position in which said first and second cutting surfaces are contiguous and coplanar and a second position in which said fist and second cutting surfaces subtend between them an angle less than 180°, a handle extending outwardly from said first block part, and actuation means operable to cause solid relative movement of said first and second block parts from said first position to said second position said handle being provided with grinding means for sharpening a knife, and means located in one of said block parts accommodating a knife.

Accordingly the present invention provides, at least in one or more of its preferred embodiments, a multi-purpose cutting block and arranged so that the block is in two sections which can be folded to form a V-shape. The block may bold a knife and the handle may be provided with riding means for sharpening the rife at any time.

By folding the cutting block, after carrying out a food chopping operation, the chopped food can be collected at the bottom of the V-shape, thereby facilitating its transfer to, for instance, a bowl or pan.

Accordingly the present invention provides a cutting block which is multi-purposed in that it integrates the functions of a board, a knife sharpener, a knife located within the board and the folding facility allow easy transfer of food. The cutting block in accordance with the invention reduces health risk, is labour saving and is convenient to use.

BRIEF DESCRIPTION OF THE DRAWINGS

An embodiment of the present invention is illustrated in the accompanying drawings, by way of example only, in which.

DETAILED DESCRIPTION OF THE INVENTION

Figure 1:
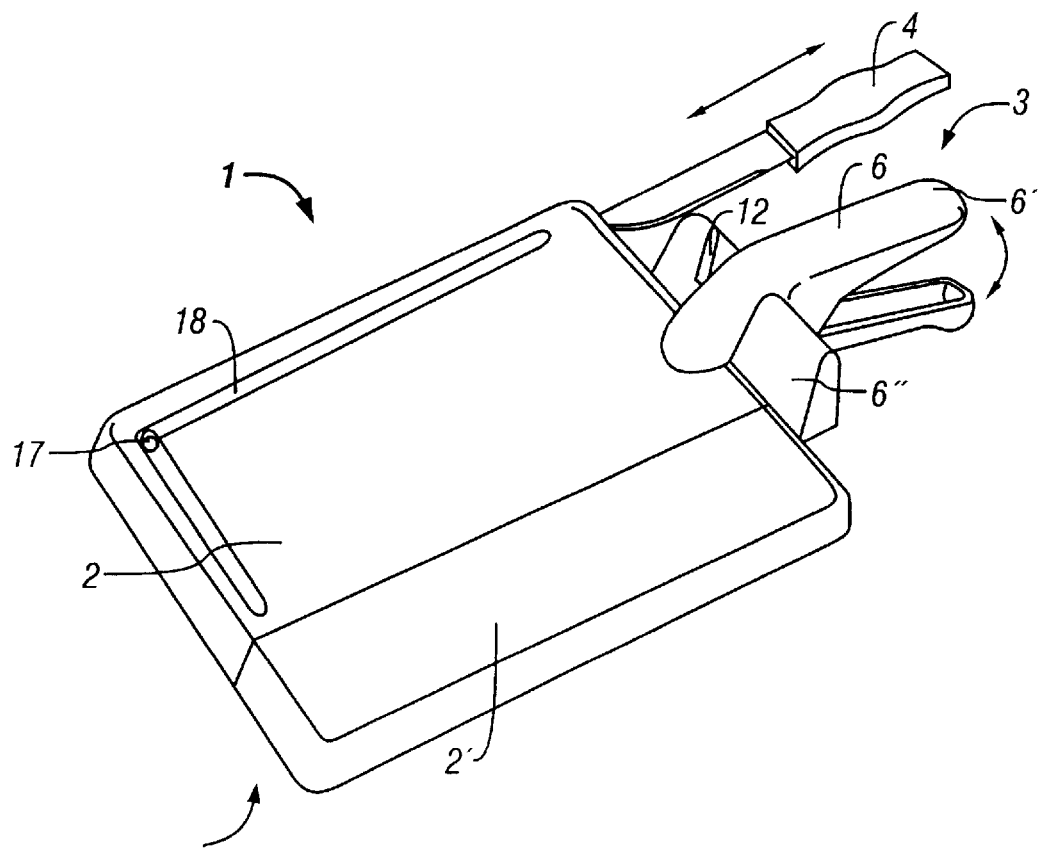
FIG. 1 is a perspective view from above of a cutting block of the invention.
Figure 3:
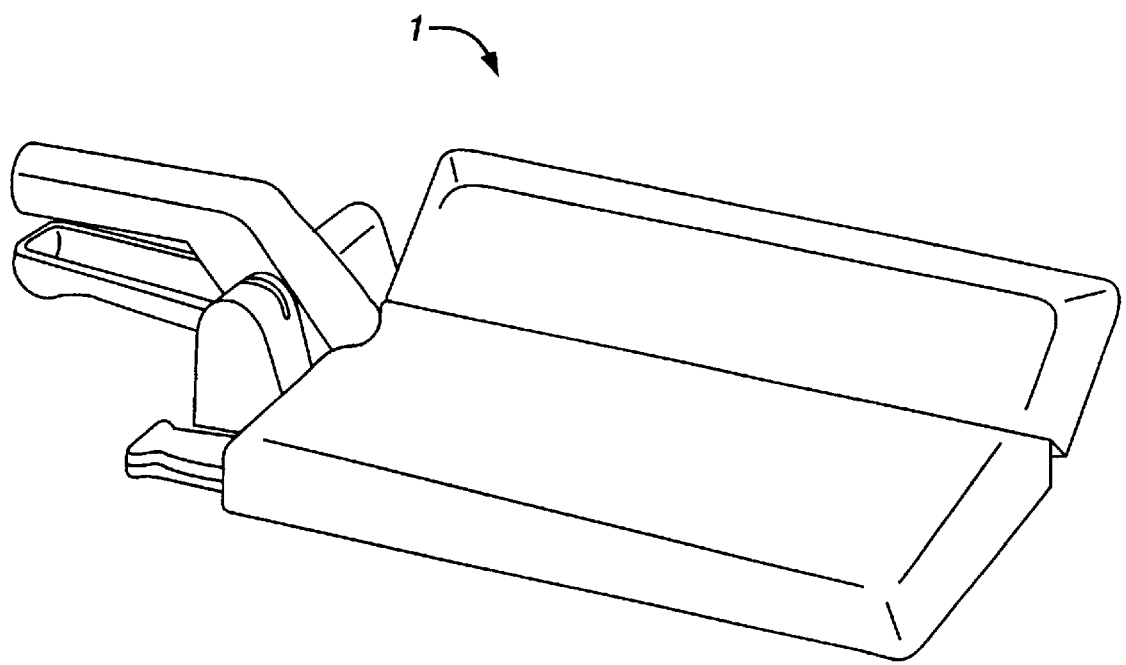
FIG. 3 is a perspective from above of the block of FIG. 1 in its folded configuration.

Referring to FIG. 1 of the accompanying drawing, an embodiment of a multipurpose cutting block 1 of the present invention comprises block part 2 and handle 3 detachably connected to one end of block part 2. Attached to block part 2 is a second block part 2' which is smaller than block part 2 and, together therewith, provides a rectangular cutting surface extending over both block parts The two block parts 2, 2' are connected together by hinges (not shown) allowing relative pivotable movement therebetween so that movement is possible between the configuration shown in FIG. 1, with a single, contiguous and coplanar cutting surfaces provided, and the configuration shown in FIG. 3 wherein the cutting surfaces, although still contiguous, are arranged at an angle which can typically be from about 20° to 60°.

Figure 2:
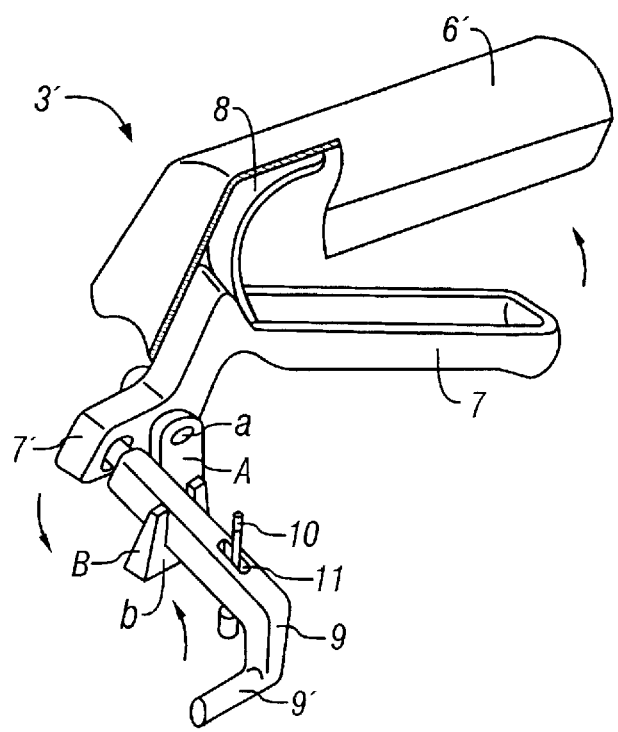
FIG. 2 is a schematic drawing of the handle and associated folding actuator of the block of FIG. 1.
Figure 4:
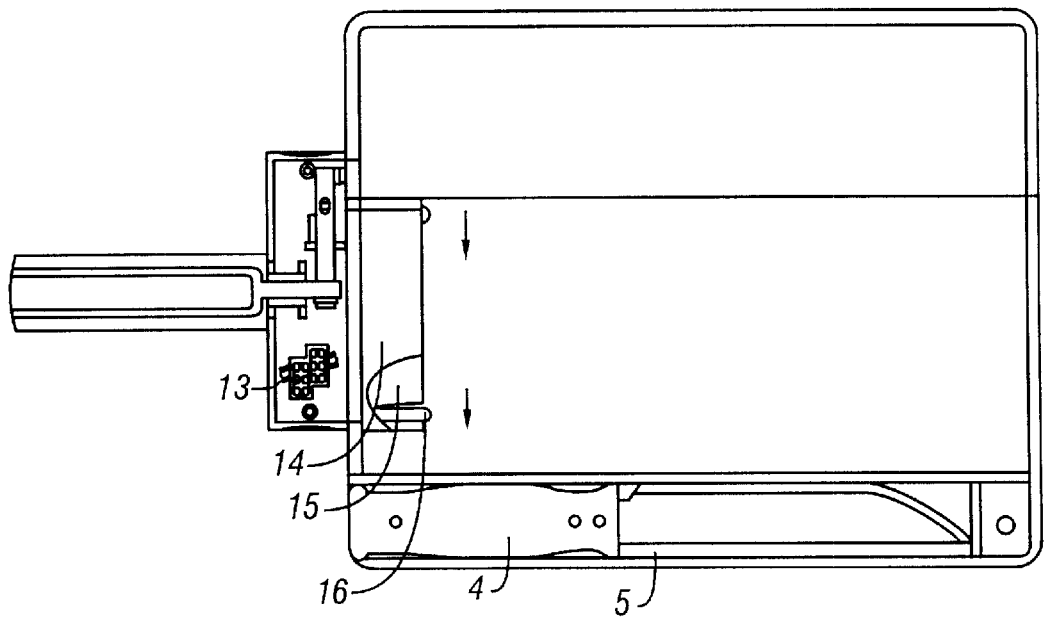
FIG. 4 is an underneath pan view of the block of FIG. 1.

Referring to FIG. 4, the block part 2 is provided, on its underside, with a recess 5 for holding a small knife 4, so that the user may store the knife for use at any time, Referring particularly to FIG. 2, handle 3 has associated therewith a block folding mechanism or actuator 3'. The handle 6 includes an upper part 61 which is fixed relative to block part 2. The lower part 7 of handle 6 is in the form of a lever having a handle part extending below handle part 6' and extending there from an arm 7' which is pivotably mounted at fulcrum point 'a' provided on a support 'A'.

Extending between movable handle part 7 and fixed handled part 6' is a leaf spraying aid which resiliently bias the two handle parts away from each other.

Lever 7 has, at that end 7' remote form handle part 6', a link to a farther lever 9 which extends laterally therefrom. Lever 9 is mounted for pivotal movement on support 'B' about fulcrum point 'b' and at its other end, remote from end 7' of lever 7, lever 9 is provided with an L-shaped finger 9' which extends downwardly from lever 9 and then substantially parallel to handle part 6'. At its free end finger engages with block part 2'.

A slot 11 is provided on lever 9 and a locating or positioning pin 10 passes through slot 11 to limit the extent of movement of lever 9. In particular the lever can move only in an upwards and downward direction and not laterally.

Referring to FIG. 1 of the accompanying drawings, handle 3 includes a transverse part 6' which, on that side adjacent to block part 2', provides a housing for the above described folding actuator. On the other side of handle part 6, the transverse part 6' is provided with a notch 12 for sharpening a knife. Furthermore, grinding material 13 is also provided in section of transverse part 6', as shown in FIG. 4.

When cutting food, the block 1 is in the configuration shown in FIG. 1. If it is then desired to transfer the chopped food into, for instance a bowl or pan, the handle part 6' and 7 are gripped and part 7 is squeezed upwardly towards part 6' against the bias of leaf spring 8. Accordingly, the end 7' of lever/handle part 7 is caused to move downward and his movement in turn causes lever 9 to pivot about fulcrum point b thereby causing finger 9' to move upwardly and to move block part 2' into the position shown in FIG. 3. As a result the chopped food is collected into the bottom of the V-shape, that is to say, into the area where the two block parts are connected together, so that it can be easily transferred into the bowl or pan.

Referring to FIG. 4 of the accompanying drawings, the underside of block part 2 is provided with a handle positioning member 14 which is channel-shaped and contains a fastening element 15 connected to the handle 3. A catch member 16 is provided on both sides of fastening element 15. When the cutting block is to be cleaned after use, the user can detach the block parts 2 and 2' from the handle by pressing catch members 16 on both sides. By separating the handle from the block parts, the washing of the components is facilitated.

Referring to FIG. 1 of the accompanying drawings, the upper part of block part 2 is provided with a drain hole 17 adjacent one corner of the block part. Draining groves 18 extend down two sides of the block part 2 and terminate at drain hole 17. Draining groove 18 and drain hole 17 facilitate the draining of liquid away from the surface of the cutting block during the food chopping operation.

It would be appreciated that the above described cutting block represents a prefeed embodiment of the present invention. Various modification may be made to this preferred embodiment without departing from the scope of the present invention.

What is claimed is:

1. A cutting block comprising a first block part providing a first cutting surface thereon, a second block part providing a second cutting surface thereon, said first and second block parts being pivotally connected together for relative movement between a first position in which said first and second cutting surfaces are contiguous and coplanar and a second position in which said first and second cutting surfaces subtend between them an angle less than 180°, a handle extending outwardly from said first block part, said handle including actuation means operable to cause movement of said second block part relative to said first block part.

2. A cutting block according to claim 1 wherein said handle comprises a first handle part, connected to said first block part, and a second handle part forming part of said actuation means and wherein said actuation means extend from the handle to said second block part.

3. A cutting block according to claim 2 wherein said handle includes biasing means to resiliently bias said first and second handle parts away from each other.

4. A cutting block according to claim 2 wherein said actuation means comprises first and second levers, a part of said first lever forming said second handle part and being pivotably movable relative to the second handle part and said second lever being connected to said first lever and extending laterally therefrom to translate the movements of said first lever from the handle to the second block part.

5. A cutting block according to claim 4 wherein said second lever has extending there through a locating pin for limiting the movement of said second lever.

6. A cutting block according to claim 1 wherein the handle is provided with grinding means for sharpening a knife.

7. A cutting block according to claim 6 wherein the handle is provided with the means for holding grinding material.

8. A cutting block according to claim 1 wherein said handle is detachably mounted on said first block part.

9. A cutting block according to claim 1 wherein a block member is provided with a drain hole.

10. A cutting block according to claim 9 wherein the block member is further provided with a liquid draining groove which extends into said drain hole.

11. A cutting block according to claim 1 wherein the cutting block is shaped to provide a recess for holding a knife.

12. A cutting block comprising a first block part providing a first cutting surface thereon, a second block part providing second cutting surface thereon, said first and second block parts being pivotally connected together for relative movement between a first position in which said first and second cutting surfaces are contiguous and coplanar and a second position in which said first and second cutting surfaces subtend between them an angle less than 180°, a handle extending outwardly from said first block part, said handle including actuation means operable to cause movement of said second block part relative to said first block part from said first position to said second position, said handle being provided with grinding means for sharpening a knife, and means located in one of said block parts for accommodating a knife.

* * * * *